United States Patent
Seok et al.

(10) Patent No.: US 11,050,129 B2
(45) Date of Patent: Jun. 29, 2021

(54) ELECTRODE FOR LITHIUM SECONDARY BATTERY AND LITHIUM SECONDARY BATTERY COMPRISING SAME

(71) Applicant: Samsung SDI Co., Ltd., Yongin-si (KR)

(72) Inventors: Hoon Seok, Yongin-si (KR); Junghyun Nam, Yongin-si (KR); Heeeun Yoo, Yongin-si (KR); Yeonhee Yoon, Yongin-si (KR); Bokkyu Jeon, Yongin-si (KR); Mokyun Jin, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 118 days.

(21) Appl. No.: 16/324,077

(22) PCT Filed: Oct. 16, 2017

(86) PCT No.: PCT/KR2017/011394
§ 371 (c)(1),
(2) Date: Feb. 7, 2019

(87) PCT Pub. No.: WO2018/080071
PCT Pub. Date: May 3, 2018

(65) Prior Publication Data
US 2019/0334157 A1    Oct. 31, 2019

(30) Foreign Application Priority Data

Oct. 26, 2016 (KR) .......... 10-2016-0140419

(51) Int. Cl.
*H01M 50/581*    (2021.01)
*H01M 4/13*    (2010.01)
(Continued)

(52) U.S. Cl.
CPC .......... *H01M 50/581* (2021.01); *H01M 4/13* (2013.01); *H01M 4/628* (2013.01); *H01M 10/0525* (2013.01)

(58) Field of Classification Search
CPC ........ H01M 4/13; H01M 4/667; H01M 4/668; H01M 2/348
See application file for complete search history.

(56) References Cited

U.S. PATENT DOCUMENTS

2007/0054193 A1    3/2007 Ota
2012/0058378 A1*   3/2012 Lee .................. B32B 27/32
                                                  429/127
(Continued)

FOREIGN PATENT DOCUMENTS

JP      11-102730 A       4/1999
JP      2015-219983 A    12/2015
(Continued)

OTHER PUBLICATIONS

KIPO Office Action dated Jan. 25, 2021 in corresponding Korean Patent Application No. 10-2016-0140419, 6 pgs.

*Primary Examiner* — Wyatt P McConnell
(74) *Attorney, Agent, or Firm* — Lewis Roca Rothgerber Christie LLP

(57) ABSTRACT

The present disclosure relates to an electrode for a lithium secondary battery, the electrode comprising: a current collector layer; a functional layer disposed on the current collector layer; and an active material layer disposed on the functional layer, wherein the functional layer includes a polymer particle having a weight-average molecular weight of 200 to 50,000.

7 Claims, 9 Drawing Sheets

(51) Int. Cl.
*H01M 4/62* (2006.01)
*H01M 10/0525* (2010.01)

(56) References Cited

U.S. PATENT DOCUMENTS

| | | | |
|---|---|---|---|
| 2015/0050533 A1 | 2/2015 | Nam et al. | |
| 2015/0243964 A1 | 8/2015 | Yu et al. | |
| 2016/0141576 A1* | 5/2016 | Lee | H01M 10/4235 429/144 |
| 2016/0240836 A1 | 8/2016 | Aotani et al. | |
| 2017/0331146 A1* | 11/2017 | Haba | H01M 4/663 |

FOREIGN PATENT DOCUMENTS

| | | |
|---|---|---|
| KR | 10-2007-0021018 A | 2/2007 |
| KR | 10-2013-0105449 A | 9/2013 |
| KR | 10-2013-0123492 A | 11/2013 |
| KR | 10-2014-0132618 A | 11/2014 |
| KR | 10-2015-0020022 A | 2/2015 |
| KR | 10-2015-0046552 A | 4/2015 |
| KR | 10-2016-0061391 A | 5/2016 |

* cited by examiner

United States Patent US 11,050,129 B2

ELECTRODE FOR LITHIUM SECONDARY BATTERY AND LITHIUM SECONDARY BATTERY COMPRISING SAME

CROSS-REFERENCE TO RELATED APPLICATION(S)

This application is a National Phase Patent Application of International Patent Application Number PCT/KR2017/011394, filed on Oct. 16, 2017, which claims priority of Korean Patent Application No. 10-2016-0140419, filed Oct. 26, 2016. The entire contents of both of which are incorporated herein by reference.

TECHNICAL FIELD

This disclosure relates to an electrode for a lithium secondary battery and a lithium secondary battery including the same.

BACKGROUND ART

A mobile information device such as a cell phone, a laptop, a smart phone, and the like or an electric vehicle has used a lithium secondary battery having high energy density and easy portability as a driving power source. Recently, researches on using a lithium secondary battery as a driving power source or a power storage power source using characteristics of high energy density for a hybrid vehicle or a battery automobile have been actively made.

One of the main research tasks of such a lithium secondary battery is to improve safety of the secondary battery. For example, when the lithium secondary battery generates heat due to internal short circuit, overcharge, overdischarge, or the like and an electrolytic decomposition reaction and a heat runaway phenomenon occur, a pressure inside the battery may rapidly be increased and explosion of the battery may be caused. When an internal temperature or a pressure of the lithium secondary battery is increased, the lithium secondary battery breakages to occur cracks in the secondary battery and in this case, breakages progressed in a small scale may cause second and third explosions according to chain reactions with an electrolyte as air is flowed therein.

Such an explosion may not only damage the lithium secondary battery but may also cause fatal damages to the user and therefore, it is urgent to develop a technique capable of improving stability of a lithium secondary battery.

DISCLOSURE

Technical Problem

Embodiments provide a lithium secondary battery having improved stability while maintaining excellent battery performance.

Technical Solution

In one aspect, the present disclosure provides an electrode for a lithium secondary battery including a current collector layer, a functional layer disposed on the current collector layer, and an active material layer disposed on the functional layer, wherein the functional layer includes a polymer particle having a weight-average molecular weight of 200 to 50,000.

In another aspect, the present disclosure provides a lithium secondary battery including a positive electrode, a negative electrode, and an electrolyte solution, wherein at least one of the positive electrode and the negative electrode is the electrode according to the embodiment of the present disclosure.

Advantageous Effects

According to embodiments, the secondary battery of the present disclosure may improve stability significantly and may ensure excellent charge and discharge characteristics.

MODE FOR INVENTION

Figure 1:
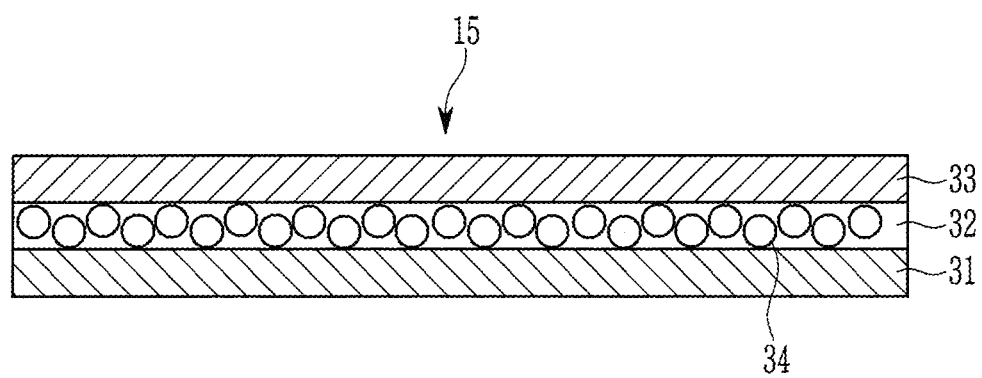
FIG. 1 shows a cross-section of an electrode for a lithium secondary battery according to an embodiment of the present disclosure.

The present invention will be described more fully hereinafter with reference to the accompanying drawings, so that a person having an ordinary skill in this art may perform embodiments easily. However, the present invention may be embodied in many different forms and is not construed as limited to the example embodiments set forth herein.

In order to clearly illustrate the present invention, parts that are not related to the description are omitted, and the same or similar components are denoted by the same reference numerals throughout the specification.

Sizes and thicknesses of components in the drawings are arbitrarily expressed for convenience of description and, thus, the present invention is not limited by the drawings.

In addition, unless explicitly described to the contrary, the word "comprise" and variations such as "comprises" or "comprising," will be understood to imply the inclusion of stated elements but not the exclusion of any other elements.

FIG. 1 shows a cross-section of an electrode for a lithium secondary battery according to an embodiment of the present disclosure.

Referring to FIG. 1, an electrode 15 according to an embodiment of the present disclosure may have a structure where a current collector layer 31, a functional layer 32, and an active material layer 33 are sequentially stacked.

The functional layer 32 may include polymer particles 34.

A weight-average molecular weight of the polymer particles 34 may be 200 to 50,000, and specifically 300 to 10,000. When the weight-average molecular weight of the polymer particles satisfies the above ranges and the functional layer 32 including the polymer particles 34 is formed between the current collector layer 31 and the active material layer 33 of the electrode 15 for a lithium secondary battery according to the present disclosure, stability of the lithium secondary battery may be remarkably improved.

An average particle size of the polymer particles 34 may be 0.3 μm to 2.3 μm, and specifically, 0.6 μm to 1.0 μm. When the average particle size of the polymer particles satisfies the ranges, a lithium secondary battery having excellent performance as well as improved stability may be realized.

In the present specification, the average particle size denotes a particle diameter when a cumulative volume is 50 volume % in a particle distribution.

Subsequently, a thickness of the functional layer 32 may be 5 μm to 15 μm and specifically, 7 μm to 12 μm. When the thickness of the functional layer 32 is greater than or equal to 5 μm, an internal temperature of the lithium secondary battery is increased, and thus the polymer particles 34 in the functional layer 32 may be melted to form an insulation layer on the electrode 15. Thereby, a transport path for ions and the like between the current collector layer 31 and the active material layer 33 may be blocked and second and third explosions from an additional reaction may appropriately be prevented. In addition, when the thickness of the functional layer 32 is less than or equal to 15 μm, the functional layer has no influence on performance of a battery, even though the functional layer, if necessary, functioning as the insulation layer is included, and accordingly, a lithium secondary battery having excellent charge and discharge characteristics and capacity characteristics may be realized.

An amount of the polymer particles 34 may be 93 wt % to 98.5 wt %, and specifically 94 wt % to 97.5 wt % based on a total amount of the functional layer 32. When the amount of the polymer particles 34 satisfies the ranges, and an internal temperature of a lithium secondary battery according to the present disclosure is increased, the polymer particles 34 of the functional layer 32 included in the electrode 15 for a lithium secondary battery may be melted and appropriately play a role of functioning as an insulation layer.

On the other hand, the polymer particles 34 may have a melting temperature ranging from 90° C. to 125° C. and specifically, 90° C. to 110° C. When the melting temperature of the polymer particles 34 is greater than or equal to 90° C., the polymer particles 34 are not melted, as far as a lithium secondary battery normally works, and accordingly, the functional layer 32 included in an electrode has no influence on performance of a battery. In addition, when the melting temperature of the polymer particles is less than or equal to 125° C., an internal temperature of a lithium secondary battery is increased, and the polymer particles are melted, before second and third explosions occur, and accordingly, the functional layer 32 functions as an insulation layer and thus has an excellent effect of improving stability of a lithium secondary battery.

In the present specification, the melting temperature of the polymer particles 34 denotes a temperature at which the polymer particles are melted and a phase change from a particle to a liquid occurs.

The functional layer 32 may include a conductive material in addition to the polymer particles 34. In this way, as it includes conductive material, the functional layer has no influence on performance of a battery, as far as a lithium secondary battery normally works, and accordingly, may realize a lithium secondary battery having excellent capacity characteristics and charge and discharge characteristics.

Herein, the conductive material may be any material having electrical conductivity unless it causes a chemical change, and may be, for example, a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof, and the like.

In the present disclosure, when an electrode having the functional layer 32 between the current collector layer 31 and the active material layer 33 as shown above is applied to a lithium secondary battery, excellent battery performance may not only be maintained, but stability may also be remarkably improved.

The current collector layer 31 may play a role of transporting electrons in the electrode to the outside and supporting the functional layer 32 and the active material layer 33.

The current collector layer 31 may be a positive current collector layer or a negative current collector layer.

The positive current collector layer may use, for example, an aluminum foil, a nickel foil, or a combination thereof, but is not limited thereto.

The negative current collector layer may be, for example, a copper foil, a nickel foil, a stainless steel foil, a titanium foil, a nickel foam, a copper foam, a polymer substrate coated with a conductive metal, or a combination thereof, but is not limited thereto.

On the other hand, the active material layer 33 may be a positive active material layer or a negative active material layer. The positive active material layer includes a positive active material of a lithium secondary battery and the negative active material layer includes a negative active material of a lithium secondary battery.

When the active material layer 33 is a positive active material layer, in the positive active material layer, an amount of the positive active material may be 90 wt % to 98 wt % based on a total weight of the positive active material layer.

The positive active material may use a compound capable of intercalating and deintercallating lithium (lithiated intercalation compound).

Specifically, at least one composite oxide of a metal selected from cobalt, manganese, nickel, and a combination thereof, and lithium may be used. Specific examples thereof may be a compound represented by one of chemical formulae. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 0 \leq b \leq 0.5$, $0 \leq c \leq 0.5$, $0 \leq \alpha \leq 2$); $Li_aNi_{1-b-c}Co_bX_eO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_eO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_eO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_eO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_{b-}Co_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$) $Li_aCoG_bP_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$);

$QO_2$, $QS_2$, $LiQS_2$, $V_2O_5$, $LiV_2O_5$, $LiZO_2$, $LiNiVO_4$, $Li_{(3-f)}J_2(PO_4)_3$ (0≤f≤2); $Li_{(3-f)}Fe_2(PO_4)_3$ (0≤f≤2); $Li_aFePO_4$ (0.90≤a≤1.8)

In chemical formulae, A is selected from the group consisting of Ni, Co, Mn, and a combination thereof; X is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, and a combination thereof; and J is selected from the group consisting of V, Cr, Mn, Co, Ni, Cu, and a combination thereof.

The compounds may have a coating layer on the surface or may be mixed with another lithium metal oxide having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed by a method having no adverse influence on properties of a positive active material by using these elements in the compound, for example, spray coating, dipping, etc. However, the coating method is not limited thereto, and a detailed description thereof will be omitted because it is well understood by those skilled in the art.

On the other hand, the positive active material layer may further include a binder and a conductive material. Herein, the binder and the conductive material may be included in an amount of 1 wt % to 5 wt %, respectively based on a total amount of the positive active material layer.

The binder improves binding properties of positive active material particles with one another and with a current collector, and examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity, any electrically conductive material may be used as a conductive material unless it causes a chemical change, and examples thereof a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

When the active material layer 33 is a negative active material layer, it may be formed by using negative electrode slurry including a negative active material and a negative conductive material.

The negative active material may be a carbon-based material where lithium ions are easily intercalated and deintercalated and thus high-rate charge and discharge characteristics are improved.

The carbon-based material may be crystalline carbon or amorphous carbon.

Examples of the crystalline carbon may be graphite.

Examples of the amorphous carbon may be soft carbon (low temperature fire carbon) or hard carbon, a mesophase pitch carbonized product, fired coke, and the like. For example, the carbon-based material may be soft carbon.

The soft carbon is graphitizable carbon in which atoms are aligned to easily form a layered structure, and thus the layered structure is easily changed into a graphite structure as the temperature of the heat-treatment is increased. The soft carbon has a disordered crystal compared with graphite and thus more gates helping in and out of ions but is less disordered than hard carbon, so that the ions may be easily diffused. As specific examples, the carbon-based material may be low crystalline soft carbon.

On the other hand, an amount of the negative active material has no particular limit but may be in a range of 70 wt % to 99 wt % and specifically, 80 wt % to 98 wt % based on a total weight of negative electrode slurry.

The carbon-based material may have various shapes such as a sphere, a sheet, a flake, a fiber, and the like, for example, a needle.

On the other hand, the negative electrode slurry may include a negative conductive material.

The negative conductive material included to provide electrode conductivity may be any electrically conductive material may be used as a conductive material unless it causes a chemical change, and examples thereof are a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

An amount of the negative conductive material may be 1.5 wt % to 40 wt %, and more specifically 1 wt % to 30 wt % or 2 wt % to 20 wt %. However, the amount of the negative conductive material may be appropriately adjusted depending on a kind and an amount of the negative active material.

In the present disclosure, the negative electrode slurry includes 70 wt % to 98 wt % of the negative active material and 1.5 wt % to 40 wt % of the negative conductive material based on the total weight of the negative electrode slurry.

As needed, the negative electrode slurry may further include a binder.

The binder improves binding properties of negative active material particles with one another and the negative active material with a current collector. The binder may be, for example, polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

Hereinafter, a lithium secondary battery according to an embodiment is described with reference to FIG. 2.

Figure 2:
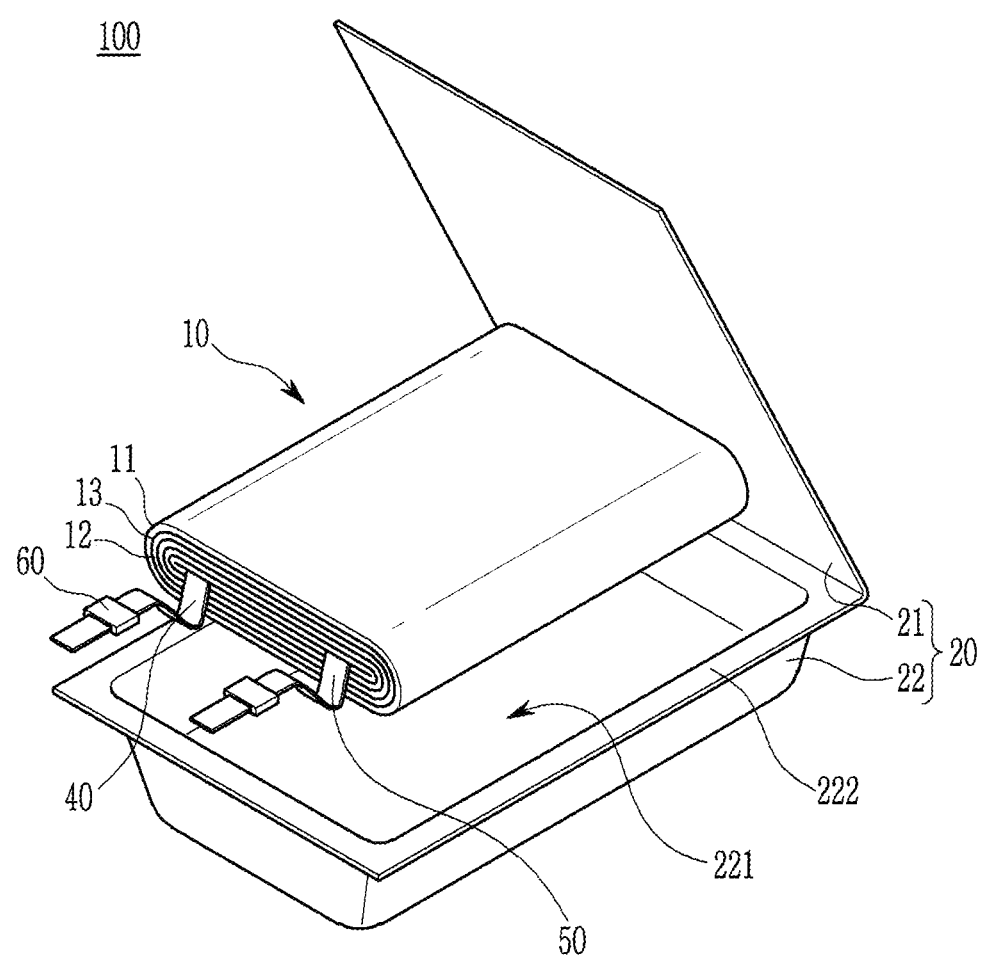
FIG. 2 is a schematic view of a lithium secondary battery according to an embodiment of the present disclosure.
Figure 3:
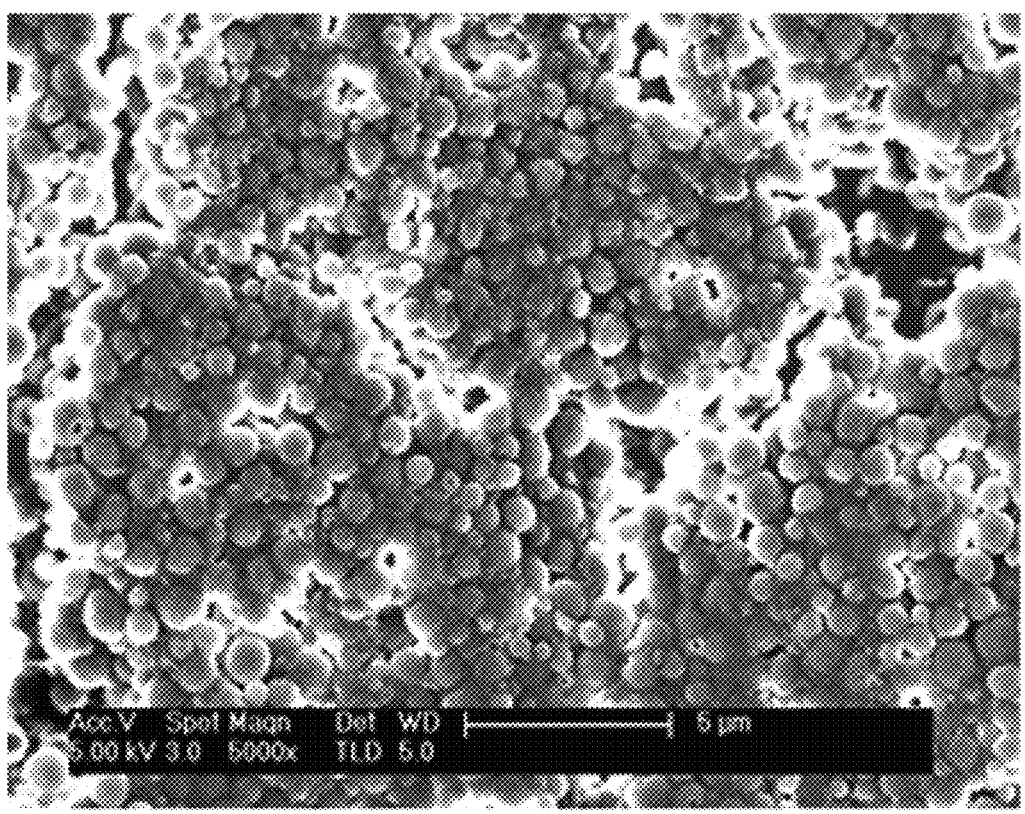
FIG. 3 is a SEM photograph showing the surface of the functional layer according to Example 1.
Figure 4:
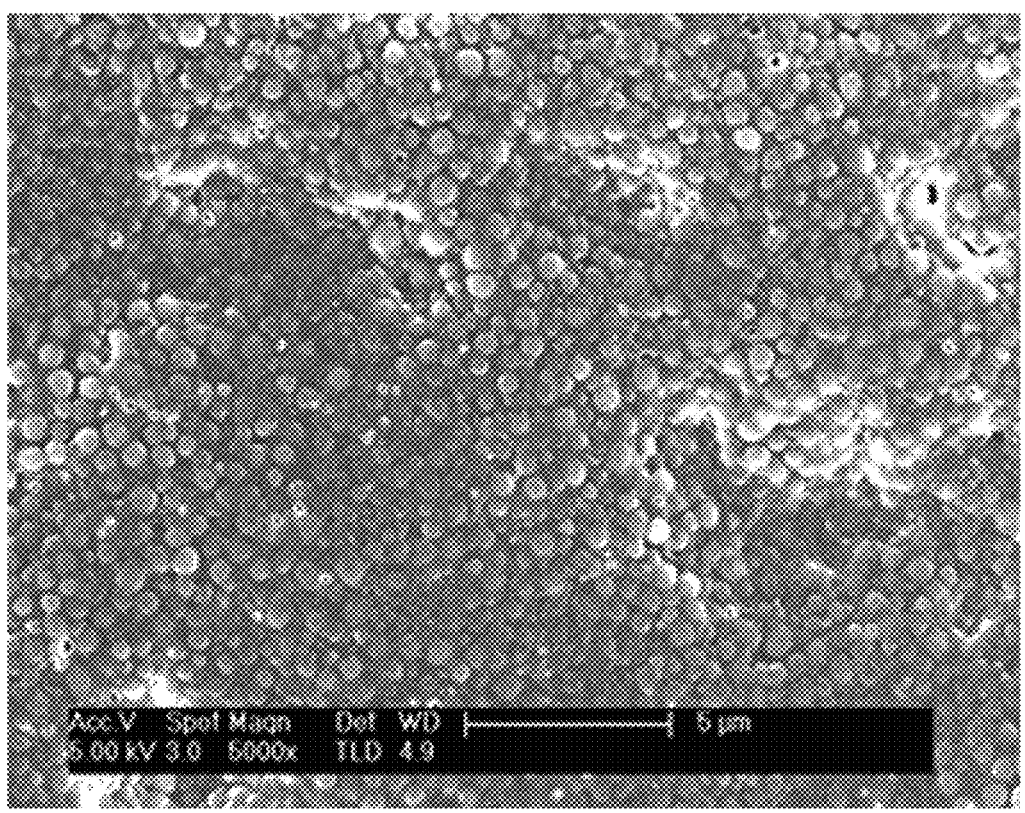
FIG. 4 is a SEM photograph showing the surface of the functional layer according to Example 2.
Figure 5:
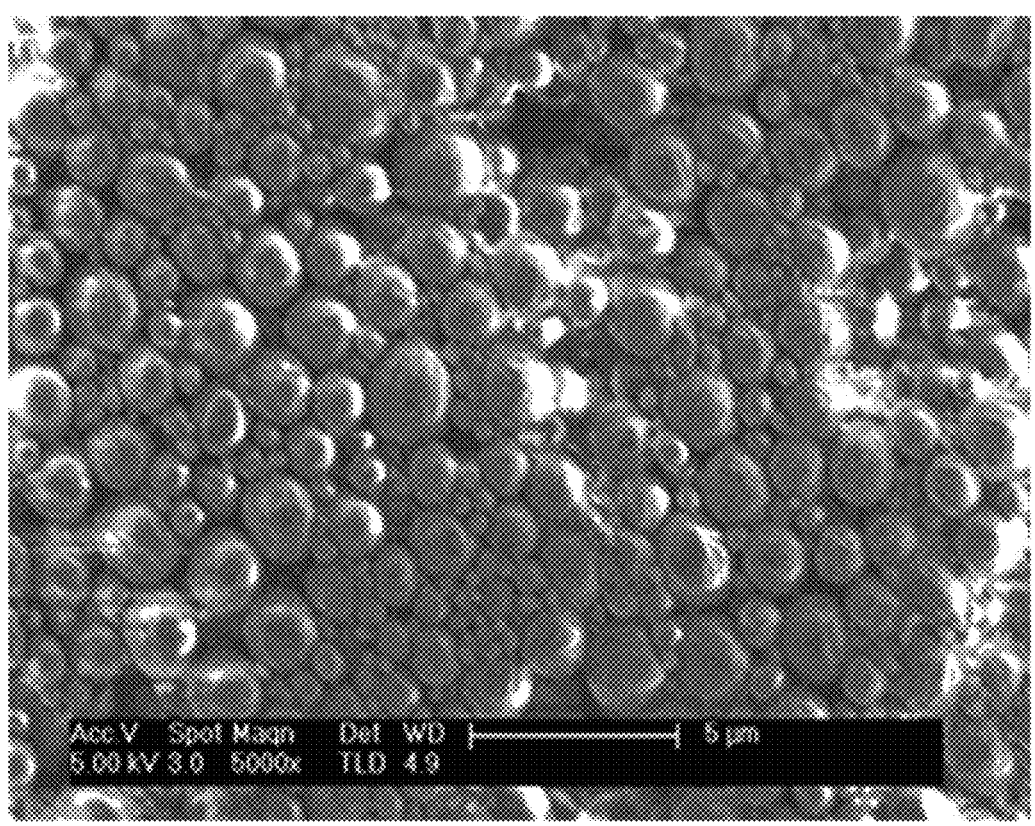
FIG. 5 is a SEM photograph showing the surface of the functional layer according to Reference Example 1.
Figure 6:
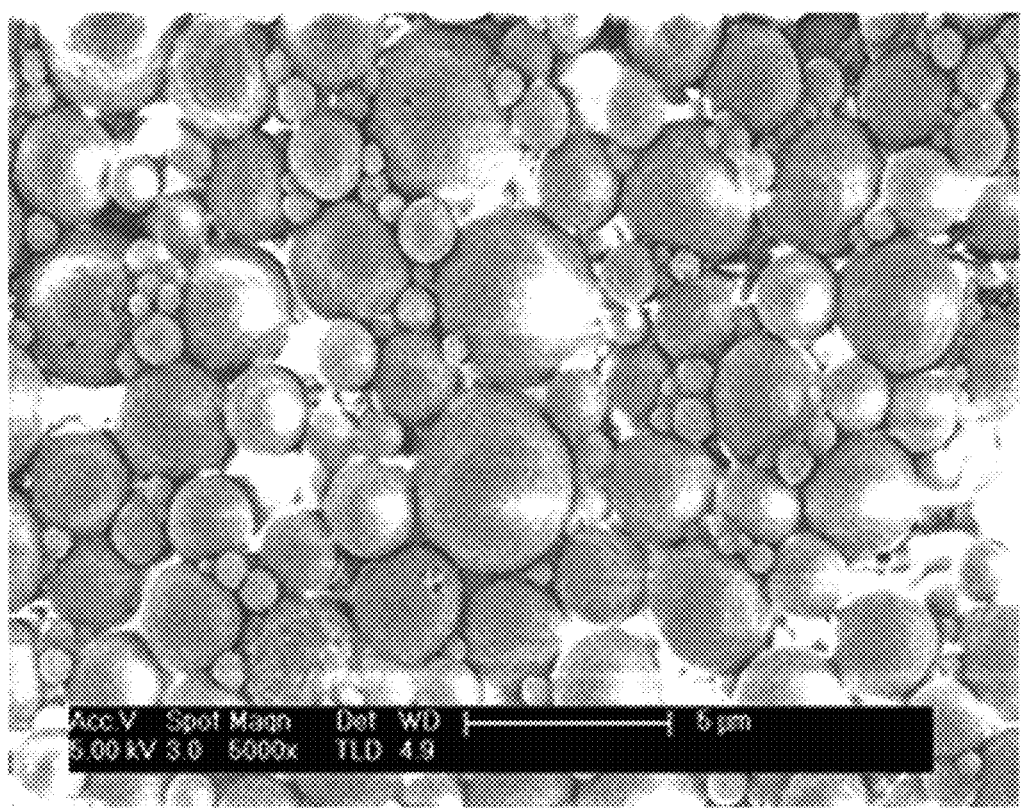
FIG. 6 is a SEM photograph showing the surface of the functional layer according to Reference Example 2.

FIG. 2 is a schematic view showing a structure of a lithium secondary battery according to an embodiment of this disclosure.

Referring to FIG. 2, a lithium secondary battery 100 according to an embodiment of the present disclosure includes an electrode assembly 10, an exterior material 20 housing the electrode assembly 10, and a positive terminal 40 and a negative electrode terminal 50 electrically connected to the electrode assembly 10.

The electrode assembly 10 may include a positive electrode 11, a negative electrode 12, a separator 13 disposed between the positive electrode 11 and the negative electrode 12, and an electrolyte solution (not shown) impregnating the positive electrode 11, the negative electrode 12, and the separator 13.

Herein, at least one of the positive electrode 11 and the negative electrode 12 may be the electrode for a lithium secondary battery 15 according to the present disclosure. Particularly, the electrode 15 may be desirably used as a negative electrode 12 in the lithium secondary battery of the present disclosure.

On the other hand, the electrode assembly 10, as shown in FIG. 2, may have a structure obtained by interposing a separator 13 between band-shaped positive electrode 11 and negative electrode 12, spirally winding them, and compressing it into flat. In addition, even though not shown, a plurality of quadrangular sheet-shaped positive and negative electrodes may be alternately stacked with a plurality of separator therebetween.

In addition, an electrolyte solution may be impregnated in the positive electrode 11, the negative electrode 12, and the separator 13.

The separator 13 may be any generally-used separator in a lithium battery which can separate a positive electrode 11 and a negative electrode 12 and provide a transporting passage for lithium ions. In other words, it may have low resistance to ion transport and excellent impregnation for an electrolyte. The separator 13 may be, for example, selected from a glass fiber, polyester, polyethylene, polypropylene, polytetrafluoroethylene, or a combination thereof, and it may have a form of a non-woven fabric or a woven fabric. For example, in a lithium secondary battery, a polyolefin-based polymer separator such as polyethylene and polypropylene is mainly used; in order to ensure the heat resistance or mechanical strength, a separator coated with a composition including a ceramic component or a polymer material may be used; and optionally, it may have a mono-layered or multi-layered structure.

The electrolyte solution includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like and the ester-based solvent may include methyl acetate, ethyl acetate, n-propyl acetate, dimethyl acetate, methyl propionate, ethyl propionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran, and the like and the ketone-based solvent may include cyclohexanone, and the like. The alcohol based solvent may include ethanol, isopropyl alcohol, and the like, and the aprotic solvent may include nitriles such as R—CN (wherein R is a C2 to C20 linear, branched, or cyclic hydrocarbon group, or may include a double bond, an aromatic ring, or an ether bond), and the like, amides such as dimethyl formamide, and the like, dioxolanes such as 1,3-dioxolane, and the like, sulfolanes, and the like.

The non-aqueous organic solvent may be used singularly or in a mixture, and when the organic solvent is used in a mixture, a mixture ratio may be controlled in accordance with a desirable battery performance, and it is well understand to one of ordinary skill in the related art.

In addition, the carbonate-based solvent is prepared by mixing a cyclic carbonate and a linear carbonate. When the cyclic carbonate and linear carbonate are mixed together in a volume ratio of 1:1 to 1:9, an electrolyte performance may be improved.

The non-aqueous organic solvent of the present disclosure may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 1.

[Chemical Formula 1]

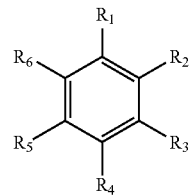

In Chemical Formula 1, $R_1$ to $R_6$ are the same or different and are selected from hydrogen, a halogen, a C1 to C10 alkyl group, a haloalkyl group, and a combination thereof.

Specific examples of the aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate or an ethylene carbonate-based compound of Chemical Formula 2 in order to improve a cycle-life of a battery.

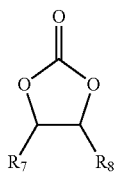

[Chemical Formula 2]

In Chemical Formula 2, $R_7$ and $R_8$ are the same or different and selected from hydrogen, a halogen, a cyano group (CN), a nitro group ($NO_2$), and a fluorinated C1 1 to C5 alkyl group, provided that at least one of $R_7$ and $R_8$ is a halogen, a cyano group (CN), a nitro group ($NO_2$), and a fluorinated C1 1 to C5 alkyl group, and $R_7$ and $R_8$ are not simultaneously hydrogen.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the additive for improving a cycle-life may be used within an appropriate range.

The lithium salt dissolved in an organic solvent supplies lithium ions in a battery, enables a basic operation of a lithium secondary battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, (wherein x and y are natural numbers), LiCl, LiI, and $LiB(C_2O_4)_2$ (lithium bis(oxalato) borate; LiBOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

The separator 13 disposed between the positive electrode 11 and the negative electrode 12 may be a polymer film. The separator may include, for example, polyethylene, polypropylene, polyvinylidene fluoride, and multi-layers thereof such as a polyethylene/polypropylene double-layered separator, a polyethylene/polypropylene/polyethylene triple-layered separator, or a polypropylene/polyethylene/polypropylene triple-layered separator.

The exterior material 20 may be made of a lower exterior material 22 and an upper exterior material 21, and the electrode assembly 10 is housed in an internal space 221 of the lower exterior material 22.

After housing the electrode assembly 10 in the exterior material 20, a sealant is applied on a sealing region 222 along the edge of the lower exterior material 22 to seal the upper exterior material 21 and the lower exterior material 22. Herein, parts where the positive terminal 40 and the negative electrode terminal 50 are in contact with the case 20 may be wrapped with an insulation member 60 to improve durability of the lithium secondary battery 100.

MODE FOR INVENTION

Hereinafter, the disclosure will be specifically examined through Examples.

Example 1

(1) Manufacture of Negative Electrode 97 wt % of polyethylene having a weight-average molecular weight of 600 and an average particle size of 1.0 µm, 2 wt % of an acrylate-based binder (BM-480B, Zeon Corp.), and 1 wt % of denka black as a conductive material were mixed to prepare a mixture. 40 wt % of the mixture was mixed with 60 wt % of a deionized water (DI-Water) solvent to prepare slurry for a functional layer.

The slurry for a functional layer was coated to be 8 µm thick on an 8 µm-thick Cu foil and dried at 80° C. to form a functional layer.

Subsequently, 97 wt % of an artificial graphite negative active material and 1.5 wt % of a styrene butadiene rubber (SBR) as a binder were mixed with 1.5 wt % of carboxymethyl cellulose (CMC) as a thickener in a DI-water solvent to prepare negative active material slurry.

Then, on the functional layer, the negative active material slurry was coated and dried at 145° C. and then, compressed to form a negative active material layer and thus manufacture a negative electrode.

(2) Manufacture of Lithium Secondary Battery Cell

The negative electrode according to (1), a lithium metal counter electrode, and an electrolyte solution were used to manufacture a coin-shaped half-cell in a common method. The electrolyte solution was prepared by dissolving 1.0 M $LiPF_6$ in a mixed solvent of ethylene carbonate and diethyl carbonate (a volume ratio of 50:50).

Example 2

Negative electrode and a lithium secondary battery cell were manufactured according to the same method as Example 1 except that the slurry for a functional layer was prepared by using polyethylene having an average particle size of 0.6 µm and then, formed into a functional layer.

Comparative Example 1

(1) Manufacture of Negative Electrode

Negative active material slurry was prepared by mixing 97 wt % of an artificial graphite negative active material, 1.5 wt % of styrene butadiene rubber (SBR) as a binder, and 1.5 wt % of carboxylmethyl cellulose (CMC) as a thickener in ultrapure water (DI-water) as a solvent.

The negative active material slurry was coated on an 8 µm-thick Cu foil, dried at 145° C., and compressed to form a negative active material layer and thus manufacture a negative electrode.

(2) Manufacture of Lithium Secondary Battery Cell

The negative electrode according to (1), a lithium metal counter electrode, and an electrolyte solution were used to manufacture a coin-shaped half-cell in a common method. The electrolyte solution was prepared by dissolving 1.0 M $LiPF_6$ in a mixed solvent of ethylene carbonate and diethyl carbonate (a volume ratio of 50:50).

Comparative Example 2

Negative electrode and a lithium secondary battery cell were manufactured according to the same method as Example 1 except that the slurry for a functional layer was prepared by using polyethylene having a weight-average molecular weight of 150,000 and then, formed into a functional layer.

Reference Example 1

Negative electrode slurry and a lithium secondary battery cell were manufactured according to the same method as Example 1 except that the slurry for a functional layer was prepared by using polyethylene having an average particle size of 2.5 μm and then, formed into a functional layer.

Reference Example 2

Negative electrode slurry and a lithium secondary battery cell were manufactured according to the same method as Example 1 except that the slurry for a functional layer was prepared by using polyethylene having an average particle size of 4.0 μm and then, formed into a functional layer. Each average particle size and weight-average molecular weight of the polyethylenes respectively used in Examples 1 to 2, Comparative Examples 1 to 2, and Reference Examples 1 to 2 was shown in Table 1.

TABLE 1

|  | Average particle size of polyethylene | Weight-average Molecular weight of polyethylene |
|---|---|---|
| Example 1 | 1.0 μm | 600 |
| Example 2 | 0.6 μm | 600 |
| Comparative Example 1 | — | — |
| Comparative Example 2 | 1.0 μm | 150,000 |
| Reference Example 1 | 2.5 μm | 600 |
| Reference Example 2 | 4.0 μm | 600 |

Experimental Example 1: Average Particle Size of Polymer Particles of Functional Layer Average particle sizes of the polymer particles included in each functional layer in the negative electrodes according to Examples 1 to 2 and Reference Examples 1 to 2 were measured by using an s3500 particle size analyzer made by Microtrac Inc.

In addition, in order to examine the particle sizes of the polymer particles with naked eyes, a surface SEM photograph was taken and the results are shown in FIGS. 3 to 6. FIGS. 3 to 6 sequentially show each surface SEM photograph of the functional layers according to Examples 1 to 2 and Reference Examples 1 to 2.

Experimental Example 2: Penetration Test

The secondary battery cells according to Examples 1 to 2, Comparative Examples 1 to 2, and Reference Examples 1 to 2 were prepared in a full charge state at 4.2 V. Subsequently, the secondary battery cells were perpendicularly penetrated by a 3φ steel nail in a length direction to perform a penetration test using a penetration machine. Herein, the nail completely penetrated a center of the secondary battery cells at a speed of 150 mm/sec.

After the penetration test, the results according to evaluation references of Table 2 are shown in Table 3.

TABLE 2

| | Level | | | | | | | |
|---|---|---|---|---|---|---|---|---|
| | Level 3 | Level 4 | Level 4-1 | Level 4-2 | Level 4-3 | Level 5 | Level 6 | Level 7 |
| Reference | No Event | Vent | Just Smoke | Short Spark | Flame (1 sec. ↑) | Fire (5 sec. ↑) | Rupture | Explosion |

TABLE 3

|  | Penetration level |
|---|---|
| Example 1 | L4-1 |
| Example 2 | L4 |
| Comparative Example 1 | L6 |
| Comparative Example 2 | L6 |
| Reference Example 1 | L6 |
| Reference Example 2 | L6 |

Referring to Table 3, the penetration test results of the lithium secondary battery cells manufactured by respectively using the negative electrodes having a functional layer including polymer particles having a weight-average molecular weight in a range of 200 to 50,000 according to an embodiment of the present invention according to Examples 1 and 2 respectively showed a penetration level of L4-1 and L4-1 and thus much improved stability.

However, the lithium secondary battery cell manufactured by using a negative electrode including no functional layer according to Comparative Example 1 and the lithium secondary battery cell manufactured by using a negative electrode having a functional layer including polymer particles having a weight-average molecular weight out of the range according to Comparative Example 2 showed a penetration level of L6 in the penetration test.

In other words, the results of the penetration test for the lithium secondary battery according to Comparative Example 2 was that the lithium secondary battery cell according to Comparative Example 2 showed a sharply increased temperature up to 400° C. to 500° C. and started to be swollen along with gas eruption and electrolyte solution-scattering and the large spark of more or equal to 5 seconds occurred and simultaneously exploded. Accordingly, the lithium secondary battery cell according to Comparative Example 2 showed sharply deteriorated stability compared with the cells according to an embodiment of the present disclosure.

Experimental Example 3: Behavior Test Depending on Temperature

The negative electrode of Example 1 was measured regarding a resistance change depending on a temperature of a functional layer by using a shut-down measuring instrument made by Toyo Corp. After a temperature in a chamber was set to be increased up to 125° C. at 4° C./min, SEM photographs showing the surfaces of the functional layer before and after increasing the temperature were respectively shown in FIGS. 7A and 7B.

Figure 7A:
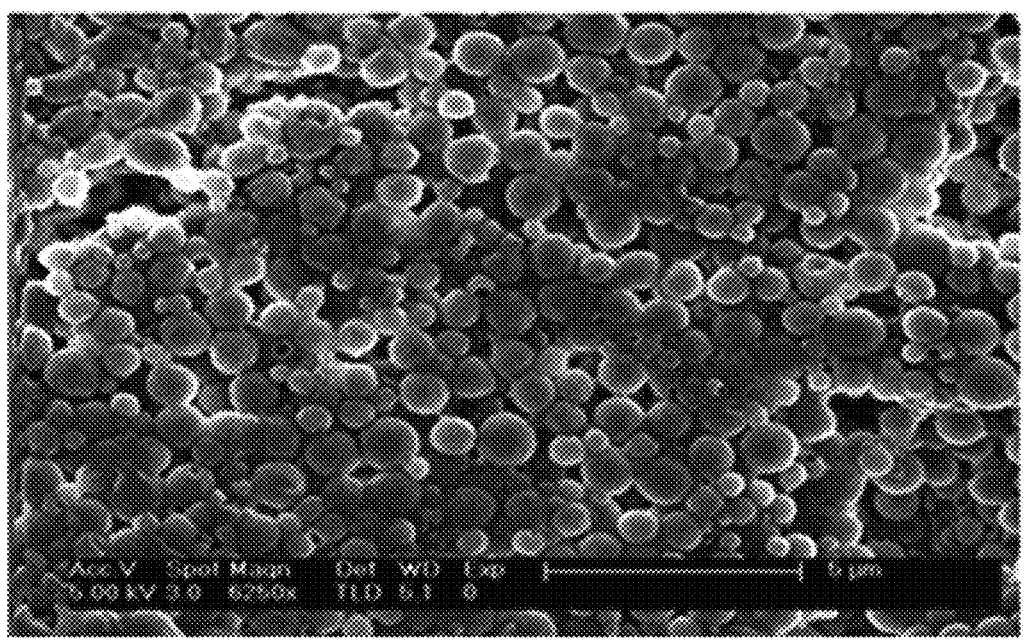
FIG. 7A is a SEM photograph showing the surface when the lithium secondary battery cell according to Example 1 is normally driven.
Figure 7B:
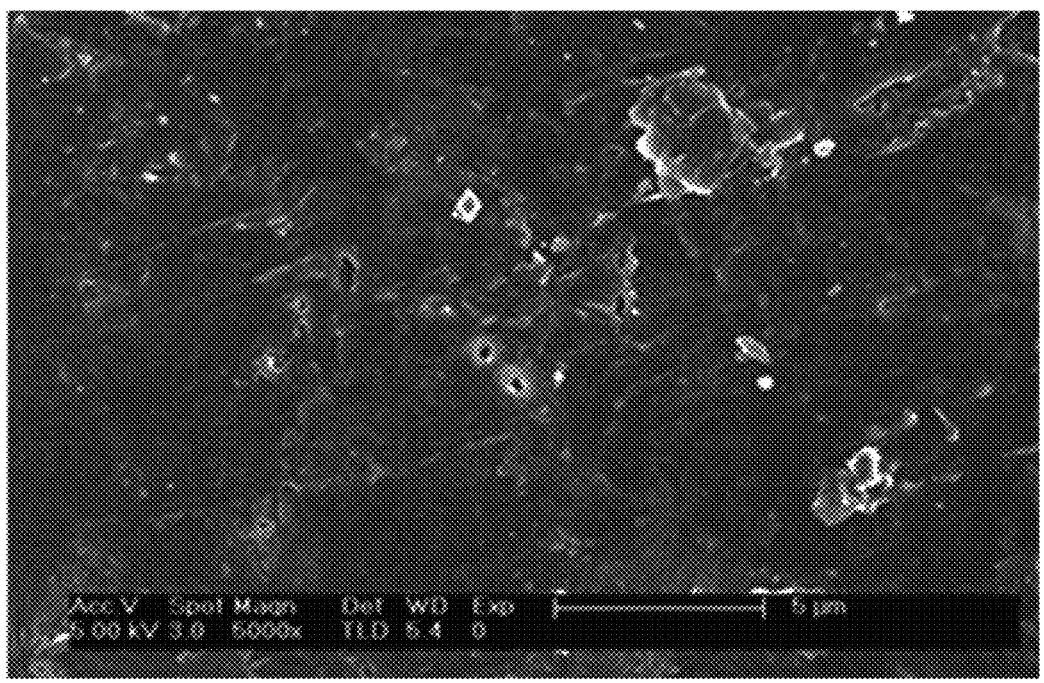
FIG. 7B is a SEM photograph showing the surface when the lithium secondary battery cell according to Example 1 is abnormally driven.

Referring to FIG. 7A, as for the functional layers included in the negative electrode according to the present disclosure, ions were normally transported when a lithium secondary battery cell normally worked. However, referring to FIG. 7B, when the lithium secondary battery cell abnormally worked, for example, when an ion transportation, a current increase, and a temperature increase up to a range of 90° C. to 120° C. rapidly proceeded, polymer particles included in the functional layer were melted and blocked all pores or openings formed in the functional layer.

Accordingly, the blocked pores or openings in the functional layer prevented the ion transportation and remarkably deteriorated a current amount and a temperature increase rate and thus secured safety.

Experimental Example 4: Measurement of Cycle-Life Characteristics

The lithium secondary battery cells according to Example 1 and Comparative Example 1 were measured regarding cycle-life characteristics.

In other words, the lithium secondary battery cells according to Example 1 and Comparative Example 1 were respectively charged up to 4.25 V at a constant current of 1 C at room temperature of 25° C. and then, discharged at constant voltage of 4.25 V, and then, the charge was cut off at a current of less than or equal to 228 mA. Subsequently, the lithium secondary battery cells were allowed to stand for 20 minutes, discharged down to 2.8 V at a constant current of 1 C, and then allowed to stand for 20 minutes again, in which this charge and discharge was 220 times repeated to measure a capacity retention of the cells, and the results are shown in FIG. 8.

Figure 8:
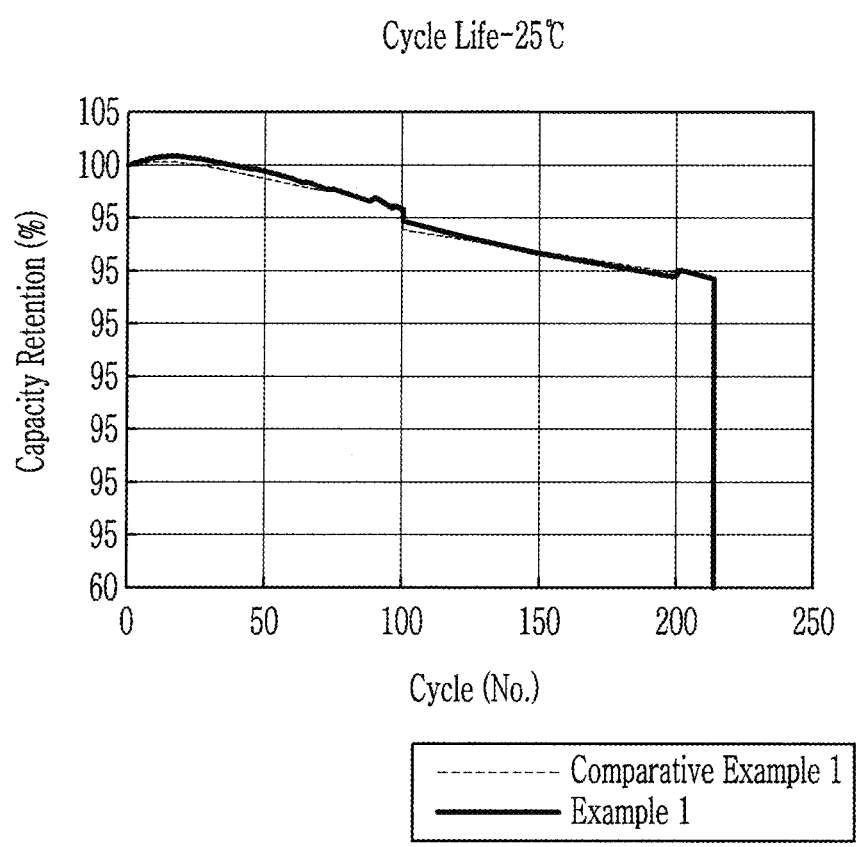
FIG. 8 shows measurement results of cycle-life characteristics with respect to Example 1 and Comparative Example 1.

As shown in FIG. 8, although the lithium secondary battery cell according to Example 1 included a functional layer, it showed a similar or excellent cycle-life characteristics compared with the lithium secondary battery cell including no functional layer according to Comparative Example 1.

In other words, it can be confirmed that the addition of the functional layer to an electrode did deteriorate performance of the lithium secondary battery cells.

While this invention has been described in connection with what is presently considered to be practical example embodiments, it is to be understood that the invention is not limited to the disclosed embodiments, and on the contrary, it is intended to cover various modifications and equivalent arrangements included within the spirit and scope of the appended claims.

DESCRIPTION OF SYMBOLS

12: electrode for lithium secondary battery
31: current collector layer
32: functional layer
33: active material layer
34: polymer particles

The invention claimed is:

1. A electrode for a lithium secondary battery, comprising
a current collector layer;
a functional layer disposed on the current collector layer; and
an active material layer disposed on the functional layer,
wherein the functional layer comprises a polymer particle having a weight-average molecular weight of 200 to 600.

2. The electrode for a lithium secondary battery of claim 1, wherein an average particle size of the polymer particle is 0.3 μm to 2.3 μm.

3. The electrode for a lithium secondary battery of claim 1, wherein an average particle size of the polymer particle is 0.6 μm to 1.0 μm.

4. The electrode for a lithium secondary battery of claim 1, wherein a thickness of the functional layer is 5 μm to 15 μm.

5. The electrode for a lithium secondary battery of claim 1, wherein an amount of the polymer particle is 93 wt % to 98.5 wt % based on the functional layer.

6. The electrode for a lithium secondary battery of claim 1, wherein a melting temperature of the polymer particle is 90° C. to 125° C.

7. A lithium secondary battery, comprising
a positive electrode;
a negative electrode;
a separator disposed between the positive electrode and the negative electrode; and
an electrolyte solution,
wherein at least one of the positive electrode and the negative electrode comprises the electrode for a lithium secondary battery of claim 1.

* * * * *